United States Patent [19]

Watanabe

[11] 4,176,886
[45] Dec. 4, 1979

[54] BRAKE APPARATUS FOR MOTORCYCLE

[75] Inventor: Mamoru Watanabe, Tokyo, Japan

[73] Assignee: Watanabe Engineering Co., Ltd., Tokyo, Japan

[21] Appl. No.: 911,514

[22] Filed: Aug. 8, 1978

[51] Int. Cl.² .............................................. B60T 8/26
[52] U.S. Cl. .................................... 303/6 A; 60/581; 188/344
[58] Field of Search .................................. 60/579–581, 60/576; 188/344, 345, 349; 303/6 A, 6 C, 13

[56] References Cited

U.S. PATENT DOCUMENTS

| 3,839,868 | 10/1974 | Watanabe | 188/344 X |
| 3,863,991 | 2/1975 | Wilson | 303/6 A |

Primary Examiner—Duane A. Reger
Attorney, Agent, or Firm—Haseltine, Lake & Waters

[57] ABSTRACT

A breaking apparatus for motorcycles in which a piston movable within a master cylinder for the front wheel, is actuated by operating a hand lever. Output and input liquid pressure chambers are provided in front and at the back of the piston, respectively. At least one auxiliary piston is movable within a master cylinder of the rear wheel, and may be actuated by operating a foot pedal. At least one output liquid pressure chamber is located in front of the auxiliary piston, and the output liquid pressure chambers of the master cylinder for front and rear brakes communicate with front and rear wheel brakes, respectively. The output liquid pressure chamber of the master cylinder for the rear wheel communicates with the input liquid pressure chamber of the master cylinder for the front wheel.

9 Claims, 4 Drawing Figures

BRAKE APPARATUS FOR MOTORCYCLE

BACKGROUND OF THE INVENTION

In the conventional braking apparatus for a motorcycle, the front-wheel brake is actuated by the manipulation of a hand lever, and the rear-wheel brake is actuated by the operation of a foot pedal, independently from each other. The braking force of the front-wheel brake produced by the manipulation of the hand lever is not so great because the force of a hand is smaller than the force of a foot, although greater braking force is always required for the front-wheel brake when running at high speeds. The braking force for the front wheel could, of course, be increased if a lower ratio of the hand lever is increased, or if an assisted system is employed, or if the braking element such as a disk or drum is designed in large sizes. An increase in the braking force for the front wheel, however, is limited by a grippable range of the lever, increased manufacturing cost, mounting space, increased weight and the like.

SUMMARY OF THE INVENTION

The object of the present invention is to provide a brake apparatus for a motorcycle which can be manufactured without requiring additional manufacturing cost, which does not require increased mounting space or does not increase the weight. The braking apparatus is capable of producing increased braking force for the front wheel and and does not differ from the conventional braking apparatus in that the front brake is applied independently.

BRIEF DESCRIPTION OF THE DRAWING

Embodiments of the present Device are illustrated below with reference to the accompanying drawings.

DESCRIPTION OF THE PREFERRED EMBODIMENTS

Figure 1:
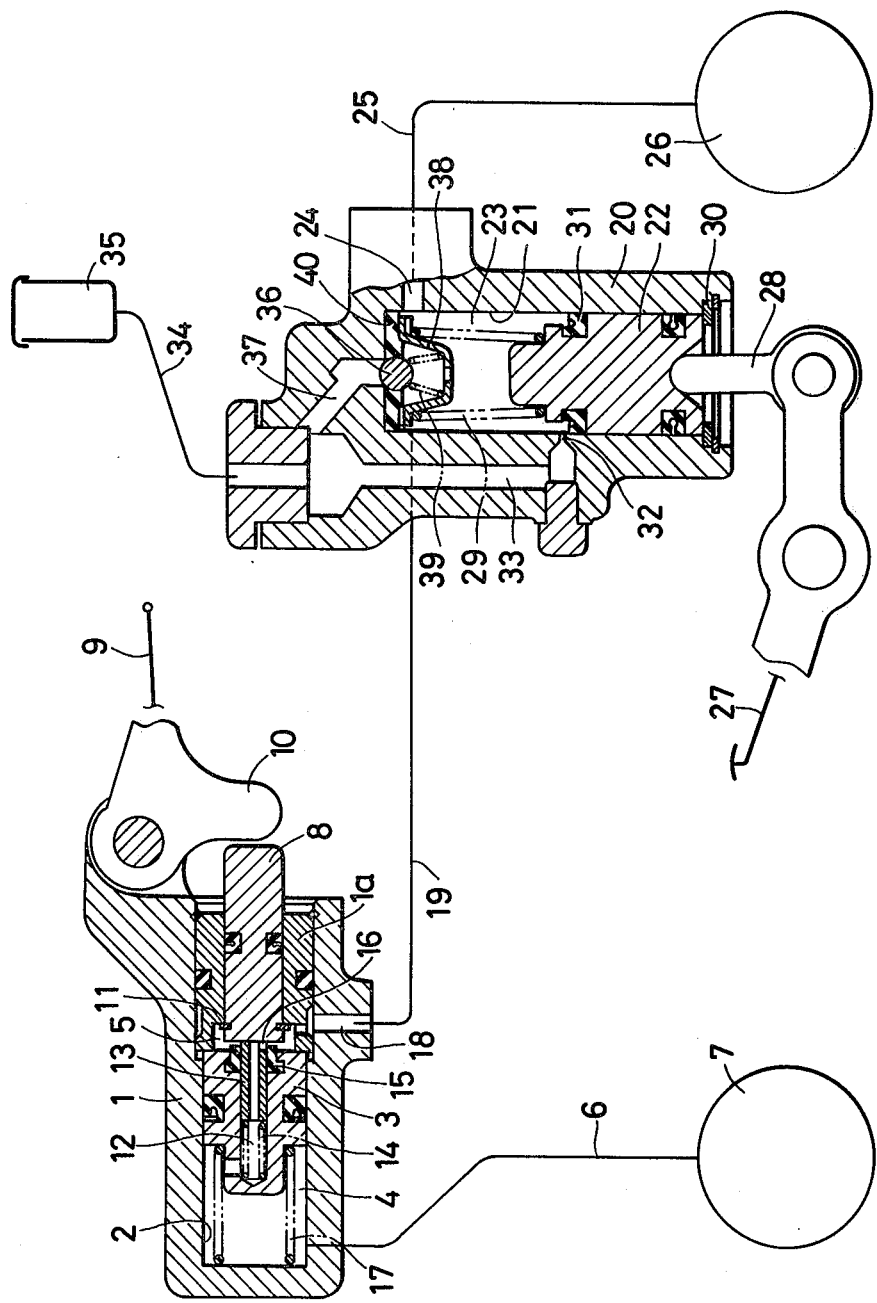
FIG. 1 is a cross sectional view of an embodiment according to the present invention.

FIG. 1 shows an embodiment of a single system, in which reference numeral 1 represents a master cylinder for the front wheel. A piston 3 is slidably contained in a cylinder 2, and in front thereof is formed an output liquid pressure chamber 4, and at the back thereof is formed an input liquid pressure chamber 5. The output liquid pressure chamber 4 communicates with a front-wheel brake 7 via a pipe 6. The opening of the cylinder 2 is closed by an end wall 1a, through which is a push rod 8. The push rod 8 penetrates slidably and is pressed by a pressing portion 10 of a hand lever 9, and is advanced. The push rod 8 has a stop ring 11, which comes into contact with the end wall 1a to determine a restoration position. The piston 3 has a liquid path 12 in which a hollow valve rod 13 is slidably inserted. The rear end of the valve rod 13 comes into contact with the push rod 8 being urged by a valve spring 14. A valve 15 is provided around the rear end of the valve rod 13, whereby deformation of the valve 15 is prevented by the valve rod 13.

A communication hole 16 is provided at the rear end of the valve rod 13 such that when the piston 3 is at the restored position, the liquid path 12 communicates with to the input liquid pressure chamber 5 via the hollow valve rod 13 and the communication hole 16. The piston 3 is returned to the restoration position at which it is in contact with the end wall being urged by a return spring 17. The input liquid pressure chamber 5 is connected to a pipe 19 through a connection port 18.

A piston 22 is slidably accommodated in a cylinder bore 21 of a master cylinder 20 for the rear wheel, and in front thereof is formed an output liquid pressure chamber 23. The output liquid pressure chamber 23 communicates with a rear-wheel brake 26 via a connection port 24 and a pipe 25, and further communicates with the input liquid pressure chamber 5 of the master cylinder 1 for the front wheel via a pipe 19. The piston 22 is connected to a push rod 28 which is advanced by the operation of a foot pedal 27. The piston 22 is returned to a restoration position where it comes into contact with a stop ring 30 being urged by a return spring 29. A piston seal 31 is fitted to the front end of the piston 22, and a return port 32 is provided slightly in front of the piston seal 31 when the piston 22 is at the restoration position. The return port 32 communicates with a reserve tank 35 via a liquid path 33 and a pipe 34. At the end portion of the cylinder bore 21 is provided a ball valve 36 which operates to open and close a compensating port 37 for connecting the reserve tank 35 to the output liquid pressure chamber 23. Reference numeral 38 denotes a spring retainer, 39 a valve spring, and 40 a valve seat.

When only the hand lever 9 is manipulated, the push rod 8 is caused to advance, whereby the valve rod 13 is pushed into the liquid path 12 against the force of the valve spring 14, and the push rod 8 is brought into intimate contact with the valve 15. The hollow portion of the valve rod 13 is then closed, and therefore the output liquid pressure chamber 4 is interrupted from both the input liquid pressure chamber 5, and from the reserve tank 35 to which the output liquid pressure chamber 4 had been applied via pipe 19, output liquid pressure chamber 23 of the rearwheel master cylinder 20, return port 32, liquid path 33, and pipe 34.

As the push rod 8 is further advanced, the piston 3 is pushed, the liquid pressure in the output liquid pressure chamber 4 is raised, and is fed to the front-wheel brake 7.

When only the foot pedal 27 is operated, the push rod 28 is caused to advance and the piston 22 is pushed. As the piston seal 31 passes over the return port 32, the output liquid pressure chamber 23 is interrupted from the reserve tank 35. The advance of the piston 22 raises the liquid pressure in the output liquid pressure chamber 23 and it is fed to the rear-wheel brake 26. The liquid pressure of the output liquid pressure chamber 23 is further supplied to the front-wheel brake 7 via pipe 19, connection port 18, input liquid pressure chamber 5, communication hole 16, hollow portion of the valve rod 13, liquid path 12, output liquid pressure chamber 4 and pipe 6.

When the hand lever 9 and the foot pedal 27 are operated simultaneously, the liquid pressure in the output liquid pressure chamber 23 of the rear-wheel master cylinder 20 is transmitted to the input liquid pressure chamber 5 of the front-wheel master cylinder 1. The above liquid pressure pushes the piston 3; the piston 3 is pushed by both the force produced by the hand lever 9 and the liquid pressure transmitted from the rear-wheel master cylinder 20. The liquid pressure from the rear-wheel master cylinder 20, acts upon the pressure-receiving area which is equal to the cross-sectional area of the piston 3 from which is subtracted the cross-sectional area of the push rod 8. Therefore, as compared to the case of manipulating the hand lever only, the liquid pressure in the output liquid pressure chamber 4 is increased by a value obtained by multiplying the liquid pressure from the rear-wheel master cylinder 20 and the reversed ratio of the cross-sectional area of the piston 3 to the pressure-receiving area.

Figure 2:
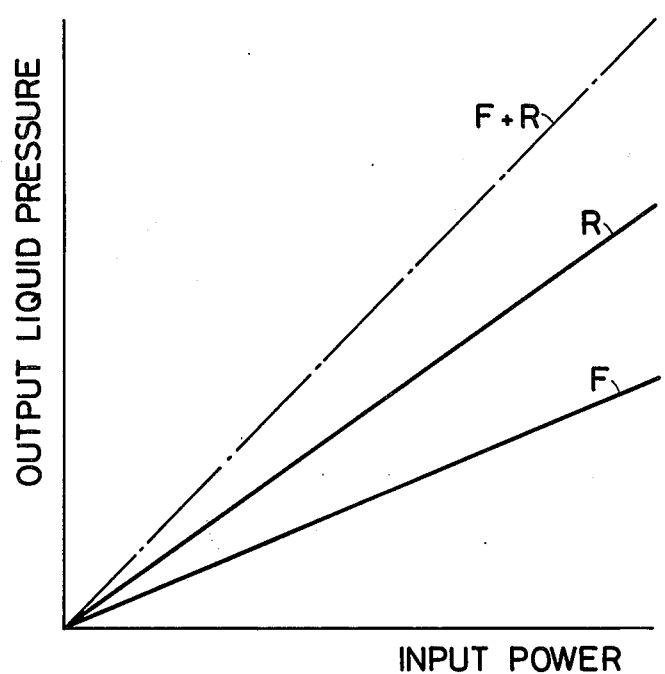
FIG. 2 is a graphical representation and shows the output liquid pressure characteristic.

FIG. 2 shows the output liquid pressure characteristics. A line F represents a liquid pressure in the output liquid pressure chamber 4 when only the hand lever 9 is operated. A line R represents a liquid pressure in the output liquid pressure chamber 23 when the foot pedal 27 is operated, and a line F+R represents the liquid pressure in the output liquid pressure chamber 4 when only the hand lever 9 and the foot pedal 27 are operated simultaneously. When running at high speeds, the motorcycle maintains a stable running state and a rider will not touch the ground with his feet; when applying the braking, therefore, the rider is allowed to simultaneously operate the hand lever 9 as well as the foot pedal 27. When applying the braking, if the foot pedal 27 is first pressed and then the hand lever 9 is then operated somewhat later, the stroke of the hand lever 9 is reduced.

In contrast to the conventional braking systems for motorcycles, the braking apparatus of the present device makes a difference in that the input liquid pressure chamber 5 is provided at the back of the piston 3 of the front-wheel master cylinder 1, and the output liquid pressure chamber 23 of the rear-wheel master cylinder 20 is connected to a input liquid pressure chamber 5 via pipe 19. Accordingly, the braking apparatus of the present device can be manufactured without requiring additional manufacturing cost, and can be installed without requiring increased mounting space or without causing the weight to be increased.

Figure 3:
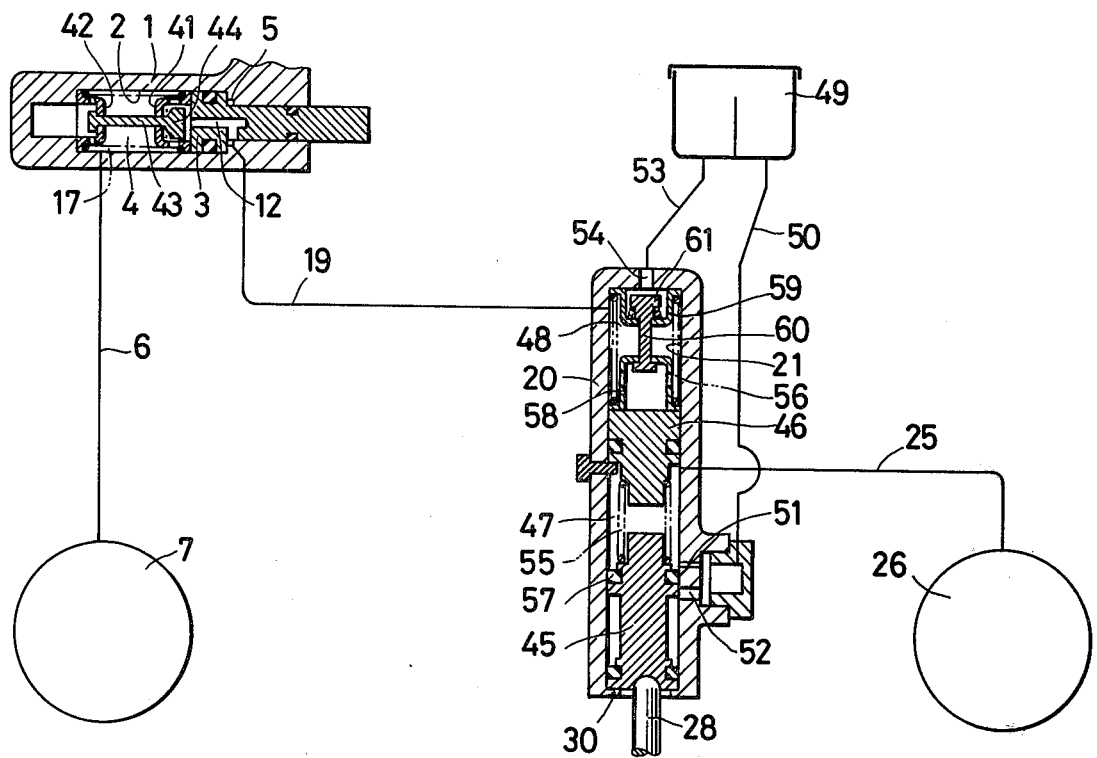
FIG. 3 is a cross sectional view showing another embodiment according to the present invention.

FIG. 3 shows another embodiment of the present device which incorporates a dual system, in which the front-wheel brake is independent of the rear-wheel brake in regard to the liquid pressure. The same portions as those of the embodiment shown in FIG. 1 are represented by the same reference numerals. The liquid path 12 in the piston 3 of the front-wheel master cylinder 1, is opened and closed by a valve 44 which is integrally formed together with a valve rod 43 held between two spring retainers 41 and 42. A small-diametered portion at the rear of the piston 3 protrudes rearwardly beyond the cylinder bore 2, and is so disposed that is will be pushed by the hand lever 9, though not diagramatically illustrated here.

The master cylinder 20 for the rear wheel is a tandem master cylinder having two pistons 45 and 46; two output liquid pressure chambers 47 and 48 are formed between the pistons 45 and 46, and in front of the piston 46, respectively. The output liquid pressure chamber 47 is connected to the rear-wheel brake 26, and the output liquid pressure chamber 48 is connected to the input liquid pressure chamber 5. A reserve tank 49 is divided into two tank chambers, whereby one tank chamber is connected to the output liquid pressure chamber 47 via pipe 50, return port 51, and compensating port 52. The other tank chamber is connected to the output liquid pressure chamber 48 via pipe 53 and center port 54.

Reference numerals 55 and 56 designate return springs, 57 a piston seal, reference numerals 58 and 59 denote spring retainers, 60 a valve rod and 61 a valve.

In this embodiment, even if fluid leakage develops in the front-wheel braking system or in the rear-wheel braking system, the remaining strong braking system makes it possible to maintain a required braking performance. Other operations are the same as those of the embodiment illustrated with reference to FIG. 1.

Figure 4:
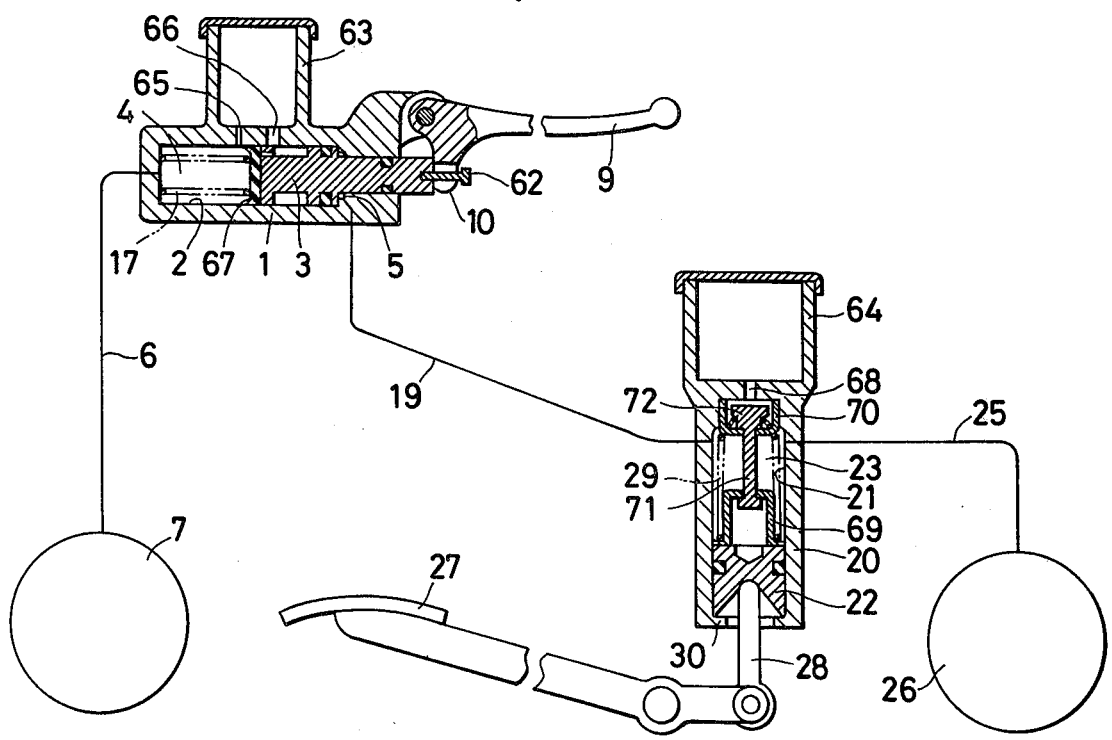
FIG. 4 is a cross sectional view showing a further embodiment in accordance with the present invention.

FIG. 4 shows a further embodiment of the present device of the type of dual system. The same members as those of the embodiment of FIG. 1 are designated by the same reference numerals. A small-diametered portion at the rear of the piston 3 of the front-wheel master cylinder 1 protrudes rearwardly beyond the cylinder bore 2 and is connected to the pressing portion 10 of the hand lever 9 by means of a pin 62. Unlike the aforementioned two embodiments, the input liquid pressure chamber 5 according to this embodiment is always interrupted, in regard to the liquid pressure, from the output liquid pressure chamber 4 by means of the piston 3. The front-wheel master cylinder 1 and the rear-wheel master cylinder 20 are provided with reserve tanks 63 and 64, respectively. Reference numeral 65 represent a return port, 66 a compensating port, 67 a piston seal, 68 a center port, reference numerals 69 and 70 designate spring retainers, 71 a valve rod and 72 a valve.

In this embodiment, when only the foot pedal 27 is operated without operating the hand lever 9, the liquid pressure in the output liquid pressure chamber 23 of the rear-wheel master cylinder 20 is not directly fed to the front-wheel brake 7. The liquid pressure from the output liquid pressure chamber 23 causes the piston 3 to advance, whereby the liquid pressure produced in the output liquid pressure chamber 4 is fed to the front-wheel brake 7. Accordingly, the liquid pressure fed to the front-wheel brake 7 is proportional to the product of the liquid pressure produced by the rear-wheel master cylinder 20 and the reversed ratio of the cross-sectional area of the piston 3 to the pressure-receiving area on the side of the input liquid pressure chamber 5. In this case, the hand lever 9 moves accompanying the advancing motion of the piston 3.

According to the present device, an input liquid pressure chamber is formed at the back of the piston of the front-wheel master cylinder, and the liquid pressure in an output liquid pressure chamber of the rear-wheel master cylinder is fed to the input liquid pressure chamber to push the piston in the front-wheel master cylinder. In this way, since the piston in the front-wheel master cylinder is pushed by the force of the hand lever and the liquid pressure from the rear-wheel master cylinder, it is allowed to increase the braking force for the front wheel. Furthermore, the apparatus of the device can be assembled without requiring additional manufacturing cost, without requiring increased mounting space, and without increasing the weight. Moreover, with the apparatus of the invention, the front brake can be applied independently as in conventional braking apparatus.

I claim:

1. Brake apparatus for a motorcycle, comprising: a piston slidable in a cylinder for a front wheel; a hand-operated lever for actuating said piston, output and input liquid pressure chambers in front and at the back of said piston respectively, at least one auxiliary piston slidable in a cylinder for a rear wheel of said motorcycle, a foot pedal for actuating said auxiliary piston in said cylinder for said rear wheel, at least one output liquid pressure chamber in front of said auxiliary piston, said output liquid pressure chambers of said cylinders for front and rear brakes communicating with front and rear wheel brakes respectively, said output liquid pressure chamber of said cylinder for said rear wheel communicating with said input liquid pressure chamber of said cylinder for said front wheel.

2. Brake apparatus as defined in claim 1 wherein an opening of said cylinder for the front wheel is closed by an end wall, and a push rod penetrating slidably through said end wall.

3. Apparatus as defined in claim 2 including a pressing portion on said hand-operated lever for pressing said push rod, said push rod having a stop ring brought into contact with said end wall for determing a restoration position.

4. Brake apparatus as defined in claim 3 wherein said piston slidable and said cylinder for said front wheel has a liquid path in which a hollow valve rod is slidably inserted, said valve rod having a rear end brought into contact with said push rod, and a valve ring for urging said push rod in predetermined direction.

5. Brake apparatus as defined in claim 1 including valve means at the rear end of said valve rod, said valve rod inhibiting deformation of said valve means.

6. Brake apparatus as defined in claim 5 wherein the rear end of said valve rod has an opening so that said liquid path communicates with said input liquid pressure chamber of said cylinder for said front wheel through said hollow valve rod and said opening when said first-mentioned piston is at the restored position.

7. A brake apparatus for motorcycle according to claim 6, including a reservoir communicating with said output liquid pressure chamber thereof, and valve means for controlling the flow of the liquid between said output liquid pressure chamber and said reservoir responsive to movement of the piston in the cylinder for the rear wheel.

8. A brake apparatus for motorcycles according to claim 6, wherein two pistons are accommodated in the master cylinder for the rear wheel, a first output liquid pressure chamber between said two pistons, a second output liquid pressure chamber in front of the front piston, one of said two output liquid pressure chamber communicating with the rear-wheel brake, the other of said two output liquid pressure chamber communicating with the input liquid pressure chamber of the cylinder for the front wheel, two reservoirs communicating with said first output liquid pressure chamber and with said second output liquid pressure chamber, respectively, and valve means in the cylinder for the rear wheel, so that the flows of the liquid between each of the output liquid pressure chambers and the corresponding reservoirs are controlled responsive to the movements of the pistons.

9. A brake apparatus for motorcycle according to claim 1, wherein the output liquid pressure chamber of the cylinder for the front wheel is always interrupted from the input liquid pressure chamber with respect to the liquid pressure, a reservoir communicating with the output liquid pressure chamber of the cylinder for the front wheel, another reservoir communicating with the output liquid pressure chamber of the cylinder for the rear wheel, and valve means for controlling the flows of the liquid between each of the output liquid pressure chambers and the corresponding reservoirs responsive to the movements of the pistons in the cylinder for the front wheel and in the cylinder for the rear wheel, respectively.

* * * * *

UNITED STATES PATENT AND TRADEMARK OFFICE
CERTIFICATE OF CORRECTION

PATENT NO. : 4,176,886

DATED : December 4, 1979

INVENTOR(S) : Mamoru Watanabe

It is certified that error appears in the above—identified patent and that said Letters Patent is hereby corrected as shown below:

On the title page add Item [30].

June 3, 1977        Japan        52-71552

Signed and Sealed this

Twenty-second Day of April 1980

[SEAL]

Attest:

SIDNEY A. DIAMOND

Attesting Officer    Commissioner of Patents and Trademarks